United States Patent [19]

Crawford et al.

[11] 3,811,921
[45] May 21, 1974

[54] METHOD OF COATING GLASS SURFACE AND PRODUCTS PRODUCED THEREBY

[75] Inventors: James E. Crawford; Richard H. Russell, both of Adrian, Mich.

[73] Assignee: Owens-Illinois, Inc., Toledo, Ohio

[22] Filed: Dec. 9, 1971

[21] Appl. No.: 206,494

[52] U.S. Cl......... 117/72, 117/104 R, 117/107.2 R, 117/124 E, 117/124 T, 117/161 P, 117/161 K, 65/60
[51] Int. Cl........................ C03c 17/32, B44d 1/20
[58] Field of Search........ 117/124 E, 54, 72, 104 R, 117/161 P, 161 K, 107.2 R, 124 T; 65/60; 260/78 UA

[56] References Cited
UNITED STATES PATENTS

| | | | |
|---|---|---|---|
| 2,174,619 | 10/1939 | Carothers | 260/78 UA |
| 3,172,775 | 3/1965 | Shaines | 65/60 UX |
| 3,203,822 | 8/1965 | Junker et al. | 117/72 X |
| 3,598,632 | 8/1971 | Long | 117/124 E |
| 3,535,112 | 10/1970 | Dolce et al. | 117/72 X |

*Primary Examiner*—Douglas J. Drummond
*Assistant Examiner*—Basil J. Lewis
*Attorney, Agent, or Firm*—Henry P. Stevens; Edward J. Holler

[57] ABSTRACT

The lubricity and the scratch resistance of a glass surface are improved by applying a pyrolyzable tin or titanium compound to the hot glass surface to form a substantially colorless tin or titanium oxide layer thereon, and then applying, directly upon the oxide layer, an aqueous solution of a water-soluble thermosetting polyamide which is a reaction product of (a) a diamino alkane having from two to eight carbon atoms and (b) a polycarboxylic acid or anhydride of the class consisting of aliphatic dicarboxylic acids and anhydrides having not more than six carbon atoms and benzene carboxylic acids and anhydrides having from three to four carboxyl groups, drying and setting the polyamide to produce a transparent, substantially colorless insoluble coating layer. The resulting dual coating has high lubricity, and affords scratch resistance which is much greater than that which would be imparted by either coating alone.

1 Claim, No Drawings

METHOD OF COATING GLASS SURFACE AND PRODUCTS PRODUCED THEREBY

BACKGROUND OF THE INVENTION

The invention relates to the treatment of glass surfaces to impart high lubricity and scratch resistance.

Glass derives its strength from an unblemished surface, and any scratches or flaws which are present on its surface decrease its strength to as little as one-fourth of the original value. Glass articles such as jars, bottles and tumblers possess their maximum strength shortly after they are formed. Their strength rapidly diminishes when they are subjected to abrasive contact in the course of handling, filling, packaging and shipping.

This problem is particularly acute when glass containers are used by processors of foods and beverages, because the glass containers are subjected to a number of processing operations wherein they are succesively washed, filled, closed and packaged for delivery. In spite of precautions taken to minimize scratching and abusive handling, the many washing, sterilizing and other operations to which such containers are subjected cause the glass to be rubbed or otherwise contacted in various ways which can cause scratching. The glass containers repeatedly come into contact with each other as they move from station to station and as they are handled in the various operations. Breakage of the glass containers can cause a substantial increase in production costs, particularly if the breakage occurs after the containers have been filled.

In order to minimize scratching and abrading of the surfaces of glass containers, which causes loss of strength and resulting breakage, glass containers have been provided with external coatings which impart scratch resistance.

One type of scratch-resistant coating which is commonly used on the exterior of glass containers is a thin, substantially colorless coating consisting of a layer of tin or titanium oxide bonded to the glass surface and covered by an organic layer consisting primarily of polyethylene. In order to be of commercial value, such a coating must not be substantially affected by the various washing cycles, such as dilute caustic wash, to which glass containers are subjected prior to filling, and must impart high lubricity and scratch resistance when the glass surface is wet as well as when it is dry.

Although a coating of polyethylene in combination with an underlying layer of tin or titanium oxide bonded to a glass surface, provides a durable, transparent, substantially colorless coating which imparts excellent lubricity and scratch resistance to the glass surface, polyethylene has a disadvantage in that it is insoluble in water. The use of an organic solvent as the vehicle for applying a coating of polyethylene is undesirable because of its cost, and because of undesirable properties of the solvent such as flammability and toxicity. Accordingly, it is customary to apply polyethylene coatings to glass containers in the form of aqueous emulsions of polyethylene.

An aqueous emulsion, as distinguished from an aqueous solution, has the disadvantage that the emulsion may become coagulated, producing gummy masses which cause considerably difficulty by plugging pipe lines and spray nozzles. Coagulation of an emulsion may occur when hard water is used in preparing the emulsion, and coagulation also may be caused by freezing, or by agitation which occurs in the pumping of an emulsion. Acidic impurities which enter an emulsion also may cause coagulation.

SUMMARY OF THE INVENTION

The principal object of the invention is to provide a surface coating for glass which may be applied to the glass in the form of an aqueous solution, and which may be set by cross-linking to produce a transparent, substantially colorless insoluble coating layer which imparts high lubricity to the glass surface.

In accordance with the invention it has been discovered that high lubricity is imparted to a glass surface by applying to the glass surface an aqueous solution of a water-soluble thermosetting polyamide which is a reaction product of (a) a diamino alkane having from two to eight carbon atoms and (b) a polycarboxylic acid or anhydride of the class consisting of aliphatic dicarboxylic acids and anhydrides having not more than six carbon atoms and benzene polycarboxylic acids and anhydrides having from three to four carboxyl groups, drying and setting the polyamide.

In a preferred embodiment of the invention, excellent scratch resistance and lubricity are provided when the layer of the cross-linked polyamide is bonded directly to a thin, transparent, substantially colorless layer of tin or titanium oxide which is bonded directly to the glass surface.

One feature of this invention is a method of treating a glass surface to improve scratch resistance and lubricity, by applying a pyrolyzable tin or titanium compound while the glass surface is at a temperature aboove the pyrolyzing temperature of the compound, to form a transparent, substantially colorless tin or titanium oxide layer on the glass surface, and then forming a transparent, substantially colorless insoluble overlying layer by applying upon the oxide layer an aqueous solution of a water-soluble thermosetting polyamide as hereinbefore described, and setting the polyamide to bond it to the oxide layer.

The use of the tin or titanium oxide coating with an overcoat of the cross-linked polyamide provides a dual coating which affords scratch resistance that is greater than the sum of the scratch resistance that would be afforded by the oxide coating alone plus the scratch resistance that would be afforded by the cross-linked polyamide coating alone.

DESCRIPTION OF THE PREFERRED EMBODIMENTS

The aqueous solution of a water-soluble thermosetting polyamide may be applied directly to a glass surface in the practice of the invention. However, in the preferred embodiment of the invention the glass surface to which the aqueous solution is applied is a surface which has been provided with a transparent, substantially colorless tin or titanium oxide layer.

In accordance with the preferred embodiment of the invention, a glass surface, which may be in the form of an article of manufacture such as a bottle, jar, tubler or other container, or a sheet of glass, is treated shortly after the article leaves the glass-forming machine, for example as the article is being conveyed to an annealing lehr. A pyrolyzable compound of tin or titanium is applied to the glass surface while it is at a temperature above that at which the compound pyrolyzes. The temperature necessary to pyrolyze a compound of tin or titanium may be between 700° and 1,300°F, depending upon the particular compound, but usually is between 800° and 1,200 F.

The compound of tin or titanium which is used in the practice of the present invention is one which upon contact with the heated glass surface reacts to form a substantially colorless, transparent tin or titanium oxide layer composed primarily of $TiO_2$ or $SnO_2$. The oxide layer is intimately bonded to the glass surface, and has an average thickness which may be as much as one micron, but preferably is less than one micron.

The titanium compounds which are suitable for this purpose include the alkyl titanates. The preferred alkyl titanates are those in which the alkyl group contains from one to about eight carbon atoms, as in tetrabutyl titanate, tetraisopropyl titanate and tetrakis(2-ethylhexyl) titanate. Also included among the suitable titanium compounds are the titanium tetrahalides, particular titanium tetrachloride.

The tin compounds that may be used in the practice of the invention include stannous and stannic compounds.

Among the suitable stannic compounds are the stannic halides such as stannic chloride, stannic bromide and stannic iodide. Other suitable stannic compounds are the alkyl stannic carboxylates having the general formula $R_xSn(OOCR')_y$ wherein R and R' are alkyl, and wherein x and y are whole numbers from 1 to 3, the sum of which is equal to four. Each alkyl radical may be branched or straight chain. R preferably contains one to eight carbon atoms, and may be methyl, propyl, butyl, isopropyl, isobutyl, hexyl, octyl or the like. R' preferably contains one to 18 carbon atoms and may be the alkyl radical of acetic, stearic, palmitic or lauric acid or the like. Examples of such alkyl stannic carboxylates include dibutyl tin diacetate, dipropyl tin diacetate, dioctyl tin diacetate, dibutyl tin distearate, dibutyl tin dipalmitate, dibutyl tin dilaurate and the like.

The stannous compounds which may be used in the practice of the present invention includes stannous halides such as stannous chloride, stannous bromide and stannous iodide, as well as stannous carboxylates having the general formula

$$Sn(OOCR)_2$$

wherein R is an aliphatic or aromatic group. The preferred aliphatic groups are substituted or unsubstituted alkyl radicals having up to 18 carbon atoms. The preferred aromatic groups include phenyl, benzyl, napthyl and the like. Suitable stannous carboxylates include stannous oleate, stannous palmitate, stannous stearate, stannous caproate, stannous laurate, stannous napthenate, stannous tartrate, stannous gluconate, stannous acetate and the like. It is to be understood, however, that dibutyl tin maleate or any other tin or titanium compound may be used which is capable of pyrolyzing to form a substantially colorless tin or titanium oxide layer on the glass surface.

The pyrolyzable tin or titanium compound may be applied to the hot glass surface in any convenient manner. For example, stannic chloride vapor or titanium tetrachloride vapor, mixed with dry air, may be passed over and contacted with the hot glass surface, or an aliphatic alcohol solution of an alkyl titanate, preferably having a concentration of at least 25%, may be sprayed onto the hot glass surface.

After the glass articles have been coated with a thin, transparent layer of tin or titanium oxide as hereinbefore described, they preferably are passed through an annealing lehr in a known manner where they are progressively cooled. When the glass articles leave the annealing lehr, the aqueous coating composition is applied upon the layer of tin or titanium oxide, using any convenient application apparatus such as a tranversing spray nozzle. Typically the glass articles have a temperature of about 300° F to about 600°F at the point of application of the aqueous coating composition. The rate at which the aquous coating composition is applied will be readily selected those skilled in the art. Exemplary rates may be from about 0.5 to about 5 quarts per 100 square feet of the lehr belt, but usually the rate is about 1 quart per 100 square feet.

The aqueous coating composition which is applied on the layer of tin or titanium oxide, or on the uncoated glass surface, is an aqueous solution of a water-soluble thermosetting polyamide which is a reaction product of (a) a diamino alkane having from two to eight carbon atoms and (b) a polycarboxylic acid or anhydride of the class consisting of aliphatic dicarboxylic acids and anhydrides having not more than six carbon atoms and benzene polycarboxylic acids and anhydrides having from three to four carboxyl groups.

The polyamide may be prepared by heating the diamino alkane with the acid or anhydride at a temperature up to about 175° until the reaction is complete. One of the reactants used may be any aliphatic dicarboxylic acid having not more than six carbon atoms, preferably an unsaturated acid, or any benzene polycarboxylic acid having from three to four carboxy groups, or an anhydride of any such acid. Examples of such a substance include oxalic acid, malonic acid, succinic acid, glutaric acid, adipic acid, maleic anhydride, fumaric acid, itaconic acid, citraconic acid, mesaconic acid, trimellitic acid, pyromellitic anhydride, chloromaleic acid, bromomaleic acid, dichloromaleic acid, dichlorofumaric acid, dichloroitaconic acid and the like. Mixtures of the acids of anhydrides may be used for the reaction to produce a mixture of polyamides if desired.

The other reactant which is used for preparing the polyamide is a diamono alkane having from two to eight carbon atoms, such as ethylenediamine, trimethylenediamine, tetramethylenediamine, pentamethylenediamine, hexamethylenediamine, and the like.

In reacting the diamono alkane with the polycarboxylic acid, it is preferable to use equimolecular proportions in order to produce a relatively long-chain polyamide.

Although the water-soluble thermosetting polyamide used in the practice of the invention is described as a reaction produce of a diamono alkane with a polycarboxylic acid which is an aliphatic dicarboxylic acid or a benzene polycarboxylic acid, or an anhydride of such an acid, it is to be understood that a minor proportion of another reactant may be incorporated in the reaction mixture without materially affecting the properties of the resulting polyamide. For example, up to one-third of the moles of the polycarboxylic acid or anhydride component in the reaction may consist of a benzen dicarboxylic acid or anhydride such as phthalic anhydride. Moreover, a mixture of aliphatic dicarboxylic acids or anhydrides, or a mixture of benzene polycarboxylic acids or anhydrides having from three to four carboxyl groups may be used for the reaction if desired. In any case, it is preferable that the number of moles of the polycarboxylic acid or anhydride or mixture of polycarboxylic acids or anhydrides used for the reaction be equal to the number of moles of the diamino alkane or diamono alkanes. Often it is convenient to use an organic solvent such as toluene as the reaction medium.

When a benzene polycarboxylic acid or anhydride having from three to four carboxyl groups is used as a reactant in preparing the polyamide, it is often desirable to incorporate a small excess, such as a 10 to 30% excess, of a free diamono alkane or mixture of diamino alkanes having from two to eight carbon atoms in the aqueous solution as a cross-linking agent.

A preferred aqueous solution for use in the practice of the invention is one which contains, in addition to a polyamide as hereinbefore described, a water-soluble thermosetting ester which is a reaction product of a non-ionic surfactant that contains at least one alcoholic hydroxy group with an aliphatic dicarboxylic acid or anhydride having not more than six carbon atoms or with a benzene polycarboxylic acid or anhydride having from three to four carboxyl groups. Such as ester may be prepared by a conventional esterification reaction, for example by heating the non-ionic surfactant with the acid or anhydride at a temperature up to about 175°C until the esterfication reaction is complete.

The surfactant which is reacted with the polycarboxylic acid in preparing the thermosetting ester may be any non-ionic surfactant that contains at least one alcohoic hydroxy group, such as polyvinyl alcohol.

One general type of surfactant which may be used for esterification with the acid or anhydride is a water-soluble either of a polyoxyalkylene diol, such as an octadecoxypolyethoxyethanol or tridecoxypolyethoxyethanol having from four to fifty ethoxy groups. In such an ether, which preferably has a molecular weight between 500 and 2,000, the polyoxyalkylene diol chains preferably are formed predominantly of oxyethylene groups, but they may contain minor proportions of oxy-1,2-propylene groups. Such eithers may be prepared by reacting a p-alkyl phenol in which the alkyl group has from six to 18 carbon atoms, or a monohydric alcohol having from one to 18 carbon atoms, such as methyl, ethyl or a propyl, butyl, tridecyl or octadecyl alcohol or a mixture of such alcohols, with ethylene oxide or a mixture of ethylene and 1,2-propylene oxides, as described in U.S. Pat. No. 2,425,755. Preferred example of such an ether is a p-alkylphenoxypolyethoxyethanol in which the alkyl radical has from six to 18 carbon atoms, such as an octylphenoxypolyethoxyethanol, nonylphenoxypolyethoxyethanol, hexylphenoxypolyethoxyethanol or dodecylphenoxypolyethoxyethanol having from four to 50 ethoxy groups.

Another type of surfactant which may be used for the esterification reaction is a water-soluble ester of a polyoxyalkylene diol. Such an ester preferably has a molecular weight between 400 and 4,000, and the polyoxyalkylene chains preferably consist predominantly of oxyethlene groups, although they may contain minor proportions of oxy-1,2-propylene groups. In the preparation of such an ester, a mixture of polyoxyalkylene diols is first prepared by reaction of water or a dihydric alcohol with ethylene oxide or with a mixture of ethylene oxide and 1,2-propylene oxide. The ester mixture is then prepared by reacting the mixture of polyoxyalkylene diols with a fatty acid, or with a fatty acid chloride or anhydride, using approximately one mole of the fatty acid reactant for each mole of diols, calculated on the basis of the average molecular weight of the diol mixture. The fatty acid reactant preferably is one having not more than 20 carbon atoms, such as acetic, propionic, butyric, 2-ethyl butyric, 2-ethyl hexanoic, lauric, palmitic or stearic acid. An alternative procedure for preparing such esters consists in starting with the fatty acid mono-ester of ethylene or propylene glycol, and reacting that mono-ester with ethylene oxide or a mixture of ethylene oxide and 1,2-propylene oxide. Specific procedures for preparing esters of polyoxyalkylene diols are described in U.S. Pat. No. 2,457,139.

Most of the surfactants hereinbefore described contain only one alcoholic hydroxy group, and are suitable for reaction with an aliphatic dicarboxylic acid having not more than six carbon atoms, or an anhydride of such an acid. On the other hand, a benzene polycarboxylic acid such as trimellitic acid or pyromellitic hydride may be reacted with a surfactant containing more than one alcoholic hydroxy group, in order to produce an ester which is water-soluble but which will set to an insoluble coating when applied to a hot glass surface. This type of water-soluble ester may contain polyester chains which are cross-linked by esterification of free alcoholic hydroxy groups derived from the surfactant and carboxyl groups derived from the benzene polycarboxylic acid.

A type of surfactant which may be advantageously esterified with trimellic acid or pyromellitic anhydride is a water-soluble polyoxyalkylene diol in which the polyoxyalkylene chains are formed predominantly of oxyethylene groups and oxy-1,2-propylene groups. Oxybutylene groups may also be present. A mixture of polyoxalkylene diols may be prepared by reacting ethylene oxide or 1,2-propylene oxide or a mixture of alkylene oxides with water or with a dihydric alcohol such as ethylene glycol, 1,2-propylene glycol, 1,3-propylene glycol, a butylene glycol, diethylene glycol, dipropylene glycol, triethylene glycol, tripropylene glycol or any other dihydroxy aliphatic compound in which the alkylene groups contain not more than six carbon atoms. The average molecular weight of a mixture of water-soluble polyoxyalkylene diols used for reaction with trimellitic acid or pyromellitic acid may range from 200 to 5,000, but preferably is between 400 and 4,000. Specific procedures for preparing mixtures of polyoxyalkylene diols are described in U.S. Pat. No. 2,425,845.

In the polyoxyalkylene compounds which have been described, the number of oxyalkylene groups in the molecule may vary from two to 100, but preferably is between four and 50. The preferred surfactants are the polyoxyalkylene diols and their ethers and esters as hereinbefore described, in which each oxyalkylene group has from two to four carbon atoms.

Often the surfactant used for the esterification reaction consists of a mixture of related substances, which produces a mixture of esters. Also, the product of the esterification reaction may consist of a mixture of half esters and diesters of the polycarboxylic acid. If the number of moles of the polycarboxylic acid used for the esterification reaction is greater than the number of moles of the non-ionic surfactant, the reaction product will consist primary of the half ester, with an excess of unreacted polycarboxylic acid. On the other hand, if the number of moles of the surfactant is more than twice the number of moles of the polycarboxylic acid, the product of the esterification reaction will consist primarily of the diester with an excess of unreacted surfactant. Any of these mixtures may be used in the aqueous coating composition.

The proportions used for the esterification reaction may range from one-half to 3 moles of the surfactant for each mole of the polycarboxylic acid. It is often advantageous to use between one-half and 1 mole of polyoxyalkylene diol for reaction with one mole of trimellitic acid or pyromellitic anhydride. A further one-half mole of the polyoxyalkylene diol mixture may then be added to the aqueous coating composition for each mole of trimellitic acid or pyromellitic anhydride starting material, in order that the added excess of polyoxyalkylene diol may serve as a cross-linking agent when the ester contacts the hot glass.

The surfactant which is used as a reactant in the preparation of the steer is usually a mixture, and the amount of surfactant to be used for the esterficiation is calculated by using the average molecular weight of the mixture.

When the composition used in the practice of the invention contains a water-soluble thermosetting ester as hereinbefore described, in addition to the thermosetting polyamide, it is preferable to heat the ester and the polyamide together at a moderate temperature, for example at a temperature not above the boiling point of water, for several minutes in order to interact the polyamide and the ester.

It is sometimes advantageous to incorporate a surfactant in the aqueous solution used in the practice of the invention. For example, one of the non-ionic surfactants hereinbefore described may be incorporated in the aqueous solution of the polyamide. Another type of surfactant which may be incorporated in the aqueous solution is an ammonium alkyl surfact, a diethanolamine alkyl sulfate or a triethanolamine alkyl surfate in which the alkyl radical has from 12 to 18 carbom atoms, such as a lauryl sulfate. Such as alkyl sulfate also may be one in which the alkyl radical corresponds to the carbom chain of a fatty acid derived from coconut oil, or a mixture of such alkyl sulfates.

Another type of surfactant which may be incorporated in the aqueous solution is an alkyl aminopolyethoxyethanol. The usual starting material from which this type of surfactant is prepared is a mixture of fatty acids such as coconut oil fatty acids, soya fatty acids or tallow fatty acids. The mixture of fatty acids may be neutralized with ammonia and then dehydrated by means of heat to produce a mixture of fatty acid amides. This mixture is converted by dehydration to a mixture of the corresponding nitriles, which then may be hydrogenated to produce a mixture of primary amines having the same carbon chains as the original fatty acids. A surfactant of the type described is commonly produced by reacting such a mixture of primary amines with ethylene oxide, using from 2 to 50 moles of ethylene oxide for each mole of primary amines, calculated on the average molecular weight of the mixture of primary amines. When ethylene oxide is reacted with a primary amine, it forms a tertiary amine by replacing both of the hydrogen atoms in the amino group of the primary amine. The preferred surfactant of this type is a mixture of tertiary amines consisting of an alkyl radical having from eight to 18 carbon atoms attached to a nitrogen atom which in turn is attached to two polyethoxyethanol chains each containing from two to 25 ethoxy groups.

Another type of surfactant which may be incorporated in the aqueous solution is a p-alkylphenyl amine in which the nitrogen atom is attached to two polyethoxethanol groups containing six to 50 carbon atoms, and the alkyl radical contains from six to 18 carbon atoms.

The aqueous solution may contain from 1 to 15 parts by weight of the surfactant for every 10 parts of the water-soluble polyamide.

In the usual practice of the invention, the aqueous solution is applied by spraying. For the sake of economy, and in order to produce a thin coating, the concentration of the aqueous solution is relatively small, usually between 0.1 and 3%.

The following examples are merely illustrative of the present invention and should not be considered to limit its scope in any way.

EXAMPLE 1

A solution of 24.5 grams of maleic anhydride in 300 ml. of dry toluene is added slowly with stirring to a solution of 29.05 grams of hexamethylenediamine in 300 ml. of dry toluene. The reaction mixture is maintained at approximately 75°C for one-half hour, and then the liquid phase is decanted from the solid reaction products. The solid reaction products are dried in an oven at 140°C at 28 inches of mercury for 15 minutes, and then are dissolved in water to produce a solution containing 0.3% by weight of the reaction products, for use as an aqueous coating composition in the practice of the invention.

Freshly formed glass bottles at a temperature of about 1,000°F were contacted with an air stream containing stannic chloride vapor as the bottles were being carried from the bottle forming machine on a belt conveyor. This air stream, produced by bubbling dry air through liquid stannic chloride, was introduced into a metal enclosure through which the bottles were carried by the belt conveyor in traveling from the bottle forming machine to an annealing lehr. Pyrolysis of the stannic chloride in contact with the hot glass surface produced a clear, substantially colorless, transparent coating of tin oxide on the exterior of the bottles. Although this coating was hard, the bottles could be scratched by firmly rubbing two of them against each other.

As the bottles reached the cold end of the annealing lehr, where their temperature was about 450°F, the aqueous coating composition was sprayed upon the bottles by means of a transversing spray nozzle at the rate of about 1 quart of the composition per 100 square feet of conveying belt. All of the bottles thus treated were found to have a clear, transparent, substantially colorless coating which was hard and which resisted scratching when two of the bottles were rubbed together.

In order to determine the scratch resistance imparted to the bottles, several bottles were subjected to the scratch test described in U.S. Pat. No. 3,323,889. This scratch test is designed to abrade the surface of one glass bottle against the surface of a similar glass bottle. One of the two bottles is fastened securely in a horizontal position in a stationary set of chucks, while a second bottle is fastened in a loading device which permits the second bottle to be moved in a straight line while the second bottle is resting upon the first bottle and while a measured amount of force is transmitted vertically from the second bottle to the first bottle. During the test the axes of the bottles are maintained at an angle of 90° to one another, and the upper bottle is moved at a constant speed of 2.8 inches per minute in a direction of an angle of 45° to the axis of each bottle. In this way, the point of contact on the exterior of each bottle moves along the bottle at a rate of 2 inches per minute in a direction from the shoulder to the base of each bottle. The test is carried out by subjecting each pair of bottles to repeated passes, the amount of force with which the upper bottle is applied against the lower bottle during each pass being greater than the amount of force used in the preceding pass. Prior to each pass, each of the two bottles is rotated to a new position so that during each pass a fresh surface of one bottle is contacted with a fresh surface of the other bottle. Thus the conditions to which one bottle is subjected during each pass are identical to the conditions to which the outer bottle is subjected. After each pass, the bottles are examined for scratches, and the test is discontinued when a visible scratch appears. The scratch resistance value which is recorded as the result of the test is the amount of force in pounds which is applied during the pass which produces a visible scratch on at least one of the two bottles. If no scratch is found after the pass during which a load of 100 lbs. is applied, the test is discontinued and the scratch resistance is recorded as 100+.

The dry scratch resistance was determined by testing several bottles in a dry condition, and the wet scratch resistance also was determined by conducting the scratch test with the contacting surfaces of each pair of bottles submerged below the surface of a body of water.

Another property of a coated surface of a glass container which tends to protect the surface against abrasion is lubricity. The lubricity was tested by a lubricity test performed upon the coated bottles. In the lubricity test, two bottles were clamped side by side in a horizontal position on a tiltable fixture, and a third bottle was laid on top of the two clamped bottles, so that the three bottles formed a pyramid, with each of the three bottles lying on its side. The fixture was then gradually tilted at a uniform rate about a horizontal axis lying in a plane perpendicular to the parallel axes of the three bottles. At the instant when the upper bottle began to slide along the two lower bottles, the tilting of the fixture was stopped and the angle of tilt of the fixture relative to its initial horizontal position was measured. This angle was considered to be the angle of repose, which is a measure of the lubricity of the coated surface, a lower angle indicating a higher degree of lubricity.

As the result of these tests, the scratch-resistance of the coated bottles was found to be 70 lbs. dry and 40 lbs. wet. This scratch-resistance is far superior to that of the untreated glass containers, which is only about 5 lbs, or less, both dry and wet. Also, the scratch-resistance of containers which have been provided with only a tin oxide or titanium oxide coating is of the order of about 5 lbs., both dry and wet. On the other hand, the scratch-resistance obtained in the practice of the invention is greatly reduced if the underlying coating of tin or titanium oxide is omitted. Thus the two coatings in combination in the practice of the invention provide a scratch-resistance which is much greater than the scratch-resistance of the oxide coating alone plus the scratch resistance afforded by the cross-linked polyamide coating alone.

The lubricity of the glass containers coated in accordance with this example was found to be 24° dry and 25° wet. This lubricity is greatly superior to that of the untreated glass containers, which is about 35° to 45°, and most typically 40° to 45°, both dry and wet.

When bottles were treated by a procedure which was the same as that hereinbefore described except that the tin oxide-coating step was omitted, the resulting bottles, coated with the polyamide alone, were found to have a dry lubricity of 23°.

EXAMPLE 2

Additional coated bottles, some with and some without an underlying coating of tin oxide, were produced by procedures which were the same as those described in Example 1, except that the concentration of the aqueous solution of the polyamide was 2.5% by weight, and the aqueous solution also contained 2.5% by weight of a surfactant which consisted of a mixture of p-nonylphenoxypolyethanols in which the average number of ethoxy groups was 39.

The scratch-resistance of the bottles having an underlying coating of tin oxide, produced in accordance with this example, was still better than the scratch-resistance of the bottles produced in accordance with Example 1. The scratch-resistance of the bottles with the underlying coating of tin oxide, produced in accordance with this example, was 100 wet and in excess of 100 dry. Even when the underlying coating of tin oxide was omitted, the bottles produced in accordance with this example had a scratch-resistance of 20 in the dry state. In contrast, the scratch-resistance of the bottles produced in accordance with Example 1 without the underlying coating of tin oxide was only five in the dry state.

The bottles produced in accordance with this example also showed excellent lubricity, in that the dry lubricity of the bottles having an underlying coating of tin oxide was 6° and the dry lubricity of the bottles having no such underlying coating was 8°.

Because of the higher concentration of the aqueous coating solution used in the present example, the solution was sprayed upon the bottles at the rate of only about 0.1 quart per 100 square feet of the conveying belt.

EXAMPLE 3

Bottles were coated by procedures which were the same as those used in Example 2, except that the surfactant used was a mixture of p-nonylphenoxypolyethoxyethanols in which the average number of ethoxy groups was four. The bottles having an underlying coating of tin oxide, produced in accordance with this example, showed a dry scratch-resistance in excess of 100, a wet scratch-resistance of 85 and a dry lubricity of 14°. The bottles produced without an underlying coating of tin oxide showed a dry lubricity of 11°.

EXAMPLE 4

Bottles were coated by procedures which were the same as those used in Example 2, except that the surfactant employed was a mixture of p-nonylphenoxypolyethoxyethanols in which the average number of ethoxy groups was 49. The bottles having an underlying coating of tin oxide, produced in accordance with this example, showed a scratch resistance in excess of 100 both dry and wet, and showed a lubricity of 7° in the dry state. The bottles produced without the underlying coating of tin oxide showed a dry lubricity of 11°.

EXAMPLE 5

A mixture of two grams of maleic anhydride and 22 grams of a mixture of nonylphenoxypolyethoxyethanols in which the average number of ethoxy groups was 49 was added to 250 ml of benzene, and the reaction mixture was refluxed for 1 hour, after which the benzene was evaporated. After the addition of 24 grams of a polyamide prepared as described in Example 1, the mixture was heated with stirring for 20 minutes. The heating was gentle and was discontinued when a reaction appeared to take place. An aqueous solution containing 5% by weight of the resulting reaction product was filtered and then diluted to a concentration of 0.25%. The resulting aqueous solution was used to coat glass containers by the procedures described in Example 1.

Glass containers having an underlying coating of tin oxide, treated in accordance with this example showed a scratch-resistance in excess of 100, both dry and wet, and showed a dry lubricity of 5° and wet lubricity of 12°. When a second batch of the composition was prepared in the same manner and was used to coat glass containers by the same procedure, the containers having an underlying coating of tin oxide also showed a scratch-resistance in excess of 100, both dry and wet, and showed a dry lubricity of 4° and a wet lubricity of 9°.

EXAMPLE 6

In two additional trails, the procedure was the same as that described in Example 5, except that the mixture of p-nonylphenoxypolyethoxyethanols used was one in which the average number of ethoxy groups was 39. In one trial the containers having an underlying coating of tin oxide showed a scratch-resistance in excess of 100, both dry and wet, and showed a dry lubricity of 4° and a wet lubricity of 21°. In the other trial, the containers having an underlying coating of tin oxide showed a scratch-resistance in excess of 100, both dry and wet, and showed a dry lubricity of 5° and a wet lubricity of 15°.

In the procedure used in these examples, when the aqueous solution in the form of a spray contacts the hot glass bottles, the water-soluble polyamide immediately dries and sets by cross-linking to produce a transparent, substantially colorless, insoluble coating. Although the setting of the polyamide to an insoluble coating can be accomplished by spraying the aqueous solution onto a hot surface, the cross-linking may be assisted if desired by the use of ultraviolet light or dielectric heating, or by the incorporation in the aqueous coating composition of a curing catalyst such as benzoly peroxide, ditertiary butyl peroxide, tertiary butyl peroctoate, tertiary butyl perbenzoate, lauroyl peroxide, tertiary butyl hydroperoxide, isopropyl percarbonate, ozone, hydrogen peroxide or other peroxides, or a source of free radials such as azobis isobutyronitrile.

EXAMPLE 7

An aqueous coating composition having a concentration of 0.25% solids was prepared by a procedure which was the same as that described in Example 5 except that succinic anhydride was employed instead of maleic anhydride. The resulting solution was used to coat glass containers by the procedures described in Example 1.

Glass containers having an underlying coating of tin oxide, treated in accordance with this example, showed a scratch resistance in excess of 100 lbs., both dry and wet, and showed a dry lubricity of 5° and a wet lubricity of 13°.

EXAMPLE 8

In an additional trial the procedure was the same as that described in Example 7, except that the mixture of p-nonylphenoxypolyethoxy ethanols used was one in which the average number of ethoxy groups in the molecule was 39. Glass containers having an underlying coating of tin oxide, treated with the aqueous coating composition in this example, showed a scratch resistance in excess of 100 lbs., both dry and wet, and showed a dry lubricity of 5° and a wet lubricity of 11°.

It is believed that when a saturated aliphatic dicarboxylic acid or anhydride such as succinic anhydride is employed, cross-linking may take place by hydrogen abstraction.

While the invention has been described above to enable one skilled in the art to practice the same, it will of course be apparent that modifications are possible which, pursuant to the patent statutes are comprehended within the scope of the present invention.

We claim:

1. A method of treating a glass surface comprising the steps of applying to the glass surface an aqueous solution of a water-soluble thermosetting polyamide which is a reaction product of (a) a diaminoalkane having from two to eight carbon atoms and (b) a polycarboxylic acid or anhydride of the class consisting of unsaturated aliphatic dicarboxylic acids and anhydrides having not more than six carbom atoms and benzene polycarboxylic acids and anhydrides having from three to four carboxyl groups, the aqueous solution further containing a water-soluble thermosetting ester which is the reaction product of (c) a non-ionic surfactant that contains at least one alcholic hydroxy group and (d) a polycarboxylic acid or anhydride as defined in (b) wherein the glass surface to which the aqueous solution is applied to a surface which has been provided with a transparent, substantially colorless tin or titanium oxide layer by applying a pyrolyzable tin or titanium compound while the glass surface is at a temperature above the pyrolyzing temperature of the tin or titanium compound and thereafter drying and setting the reaction product of the polyamide and ester to produce a second transparent, substantially colorless, insoluble layer thus providing a coating which imparts high lubricity to the surface.

* * * * *